(12) United States Patent
Bremer

(10) Patent No.: US 6,438,855 B1
(45) Date of Patent: Aug. 27, 2002

(54) PORTABLE WHEEL ALIGNMENT SYSTEM FOR MOTORCYCLES

(76) Inventor: Mark C. Bremer, 272 Pokorny Rd., Higganum, CT (US) 06441

( * ) Notice: Subject to any disclaimer, the term of this patent is extended or adjusted under 35 U.S.C. 154(b) by 39 days.

(21) Appl. No.: 09/758,617

(22) Filed: Jan. 11, 2001

(51) Int. Cl.$^7$ .............................. G01B 1/00; G01B 5/255
(52) U.S. Cl. ...................... 33/286; 33/DIG. 21; 33/203; 33/645; 33/600; 33/288; 33/203.18; 356/139.09
(58) Field of Search ........................ 33/286, 288, 203, 33/203.18, 203.19, 203.2, DIG. 21, 600, 645; 356/139.09

(56) References Cited

U.S. PATENT DOCUMENTS

| | | | |
|---|---|---|---|
| 4,096,636 A | 6/1978 | Little | 33/169 |
| 4,150,897 A | 4/1979 | Roberts, Jr. et al. | 356/152 |
| 4,338,027 A * | 7/1982 | Eck | 356/155 |
| 4,455,759 A | 6/1984 | Coetsier | 33/288 |
| 4,466,196 A | 8/1984 | Woodruff | 33/288 |
| 4,598,481 A * | 7/1986 | Donahue | 33/288 |
| 4,615,618 A | 10/1986 | Bailey et al. | 356/152 |
| 4,827,623 A * | 5/1989 | Goodell | 33/288 |
| 5,168,632 A | 12/1992 | Rimlinger, Jr. | 33/288 |
| 5,675,408 A | 10/1997 | Samuelsson et al. | 356/155 |
| 5,737,073 A | 4/1998 | Wente et al. | 356/139.09 |
| 5,781,286 A | 7/1998 | Knestel | 356/139.09 |
| 5,870,315 A | 2/1999 | January | 364/528.14 |
| 5,886,782 A * | 3/1999 | Hedgecock, Jr. | 356/155 |
| 6,240,648 B1 * | 6/2001 | Dolph | 33/203.18 |
| 2001/0022655 A1 * | 9/2001 | Stieff | 356/139.09 |

* cited by examiner

Primary Examiner—Diego Gutierrez
Assistant Examiner—Gail Verbitsky
(74) Attorney, Agent, or Firm—Alix, Yale & Ristas, LLP

(57) ABSTRACT

A portable alignment system for aligning the front and rear wheels of a motorcycle has a rear wheel assembly including rigid, longitudinally extending, first and second alignment members and a front wheel assembly including rigid, longitudinally extending, third and fourth alignment members. First and second laser units are removably mounted to the first and second alignment members, respectively. At least one measuring indicia is removably mounted to each of the third and fourth alignment members. Rear and front clamping subsystems removably clamp the first and second alignment members on either side of the rear wheel and the third and fourth alignment members on either side of the front wheel during the alignment procedure. The first and second laser units emit laser beams onto the measuring indicia mounted to the third and fourth alignment members, respectively, to provide an objective indication of the degree of alignment of the front and rear wheels.

20 Claims, 7 Drawing Sheets

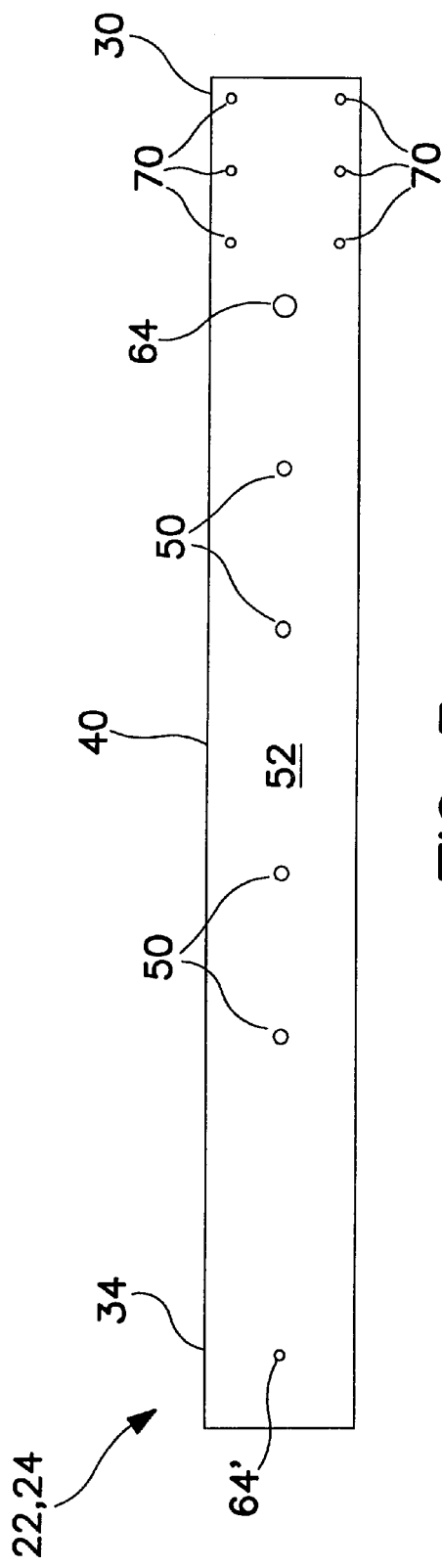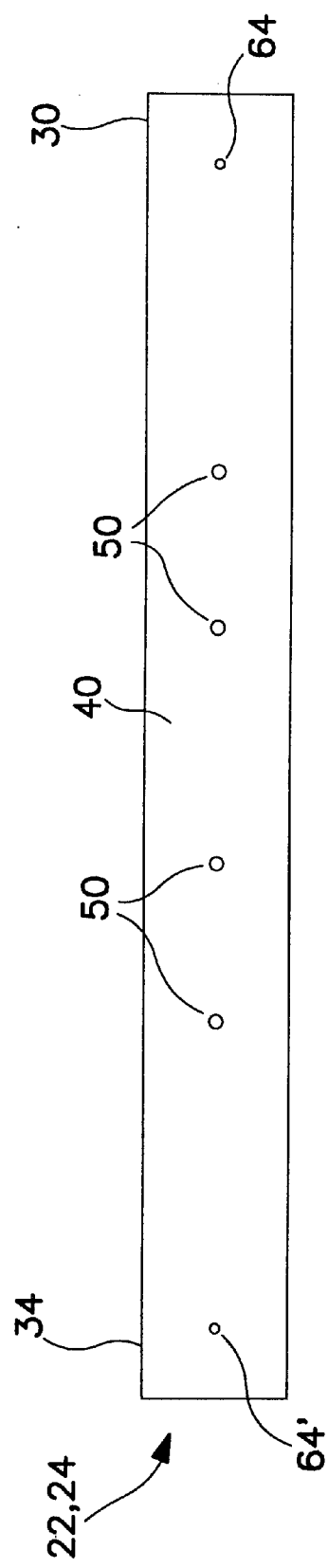

PORTABLE WHEEL ALIGNMENT SYSTEM FOR MOTORCYCLES

BACKGROUND OF THE INVENTION

This invention relates generally to apparatus for aligning the wheels of motor vehicles. More particularly, the present invention relates to apparatus for aligning the wheels of motorcycles.

Routine rear wheel maintenance for motorcycles, such as tire changes, rear brake work, rear drive chain adjustments, require that the rear axle on which the rear wheel rides be positioned fore and aft such that the rear drive chain is tensioned to the recommended value. When the rear axle is properly positioned, the rear wheel tacks in-line with the front wheel and ideally in-line with the longitudinal frame (chassis) axis for optimum stability and performance.

Many motorcycles have built in provisions for front and rear wheel alignment. Such provisions generally consist of cast or stamped "fixed" reference lines on each side of the swinging arm and corresponding "moveable" reference marks affixed to each end of the rear axle assembly. Where such alignment devices are provided, the rear wheel is properly mounted when the rear axle ends are adjusted fore and aft to obtain proper chain tension and the moveable reference marks on the axle ends are positioned at or near the corresponding fixed reference mark(s) on each side of the swinging arm.

These markings were considered a significant improvement years ago when they first started appearing on production motorcycles. However, over time it has been found that these markings are often not sufficiently accurate to provide adequate alignment of the front and rear wheels to ensure straight-line tracking for vehicle stability and rider safety. There inaccuracies are especially apparent in competition situations, where sustained high speeds and higher horsepower loads reveal chassis handling problems which are not as readily apparent during normal street riding. While the misalignment of wheels on a street riding machine might or might not cause noticeable chassis instability, these affects are greatly magnified on a closed circuit race course where the driver pushes a motorcycle to its design limits and sometimes beyond.

In order to perform a more accurate alignment of the front and rear wheels, most riders in competition use a rigid straight-edge device to affect alignment. The straight-edge device is placed along the front or rear tire sidewall chord such that it extends across the equivalent sidewall chord of opposite tire. The rear axle is typically adjusted fore and aft as required to provide proper chain tension and the wheel is adjusted such that the straight edge employed comes in contact evenly along said tire sidewall chords of each tire at two points (four total contact points ). While performing this alignment procedure, it is usually necessary to pivot the front wheel about its steering axis to obtain an assumed "straight-line" position. The straight-edge alignment apparatus and the alignment procedure utilizing such apparatus are subject to several deficiencies.

Firstly, a straight-edge device having a sufficient length and stiffness is a burden to transport. In order to be of adequate length, the typical straight-edge device must be at least seven feet long. Therefore, the straight-edge device cannot be transported in all vehicles and special provisions for storing the device during transportation may be required. Since such apparatus is generally used for competitive racing which occurs at various remote closed course race tracks, portability of the apparatus is extremely important.

Secondly, a straight-edge device is difficult to use by one person working alone. The alignment procedure utilizing these devices requires adjustments of the front wheel about its steering axis and the taking of multiple measurements at several points along the chord of the front wheel. These measurements can become very subjective in nature due to the repetitive nature of checking, adjusting, rechecking, etc. that takes place during the alignment procedure. The points along the tire sidewall from which these measurements are taken may vary in practice due to this repetition.

Thirdly, using a straight-edge device on only one side of the motorcycle will align the front and rear wheels such that they are parallel but does not reliably align the wheels such that they are axially in-line with each other. Further, using a straight edge device on only one side of the motorcycle will not ensure that either wheel is axially in-line with the motorcycle chassis. Such an alignment often results in "dogwalking" or "crabbing" seen on streets or even racetracks. The only way to achieve an accurate and acceptable alignment of the wheels' axis with each other and with the chassis longitudinal axis is to use the straight-edge device on both sides of the motorcycle. Performing the alignment procedure on one side of the motorcycle and then repeating the procedure on the other side of the motorcycle doubles the time which is required to perform the alignment and increases the measurement subjectivity.

SUMMARY OF THE INVENTION

Briefly stated, the invention in a preferred form is a portable alignment system for aligning the front and rear wheels of a motorcycle. The alignment system comprises front and rear wheel assemblies. The rear wheel assembly includes rigid, longitudinally extending, first and second alignment members. First and second laser units are removably mounted to the first and second alignment members, respectively. The front wheel assembly including rigid, longitudinally extending, third and fourth alignment members. At least one measuring indicia is removably mounted to each of the third and fourth alignment members. A rear clamping subsystem removably clamps the first and second alignment members on either side of the rear wheel of the motorcycle and a front clamping subsystem removably clamps the third and fourth alignment members on either side of the front wheel of the motorcycle during the alignment procedure. The first laser unit emits a laser beam onto the measuring indicia mounted to the third alignment member and the second laser unit emits a laser beam onto the measuring indicia mounted to the fourth alignment member to provide an objective indication of the degree of alignment of the front and rear wheels.

Each alignment member is a hollow, rectangular tube composed of a material and having a wall thickness which are selected to ensure that the tube is rigid over its length.

The first and second laser units are magnetically mounted on the outside surface of the front end portions of the respective alignment members. For alignment members composed of non-ferrous material, a mounting plate composed of ferrous material is mounted to the front end portions of the first and second alignment members.

Preferably, the measuring indicia are machinist style ruler segments composed of ferrous material. Four magnets are mounted at vertically and longitudinally spaced locations on the third and fourth alignment members such that the measuring indicia are magnetically mounted thereto.

The clamping subsystem may include multiple threaded rods and associated nuts and/or multiple hook and loop type cinch straps. A plurality of openings extend through the middle portion of each alignment member. One or two threaded rods may be inserted through opposed openings of the first and second alignment members and/or through opposed openings of the third and fourth alignment members and a nut threadably mounted on each end of the rods to clamp the alignment members to the associated wheel. A cinch strap may be engaged with the front and rear end portions of the opposed alignment members to mount a wheel assembly to a wheel. Alternatively, threaded rods and cinch straps may be used together to mount a wheel assembly to a wheel.

It is an object of the invention to provide a new and improved alignment system for aligning the front and rear wheels of a motorcycle.

It is also an object of the invention to provide a motorcycle alignment system which may be easily transported from one location to another.

It is further an object of the invention to provide a motorcycle alignment system which provides flexibility of use and which is relatively inexpensive to manufacture.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 3 is an enlarged side view of the outside of one of the alignment members of FIG. 2;

FIG. 4 is a side view of the inside of the alignment member of FIG. 3;

DETAILED DESCRIPTION OF THE PREFERRED EMBODIMENT

Figure 1:
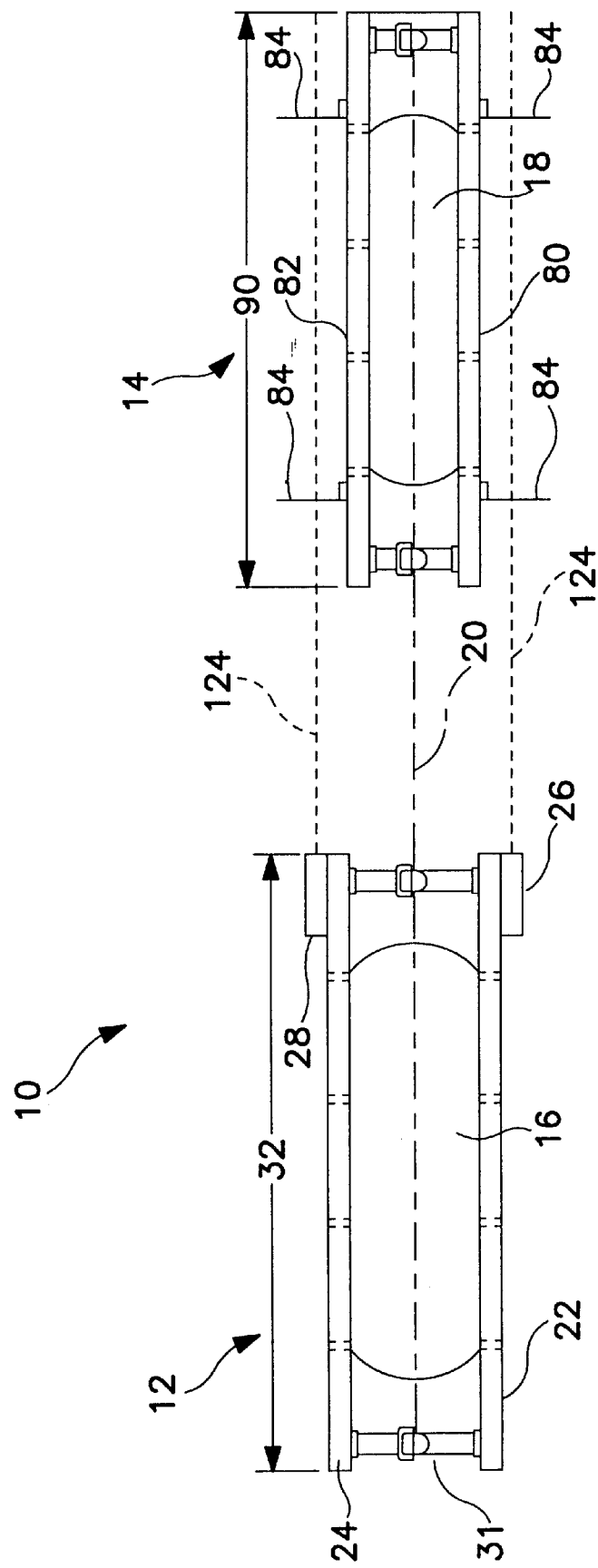
FIG. 1 is a schematic top view of a portable wheel alignment system in accordance with the invention mounted on the front and rear wheels of a motorcycle.

With reference to the drawings wherein like numerals represent like parts throughout the several figures, a portable wheel alignment system for motorcycles in accordance with the present invention is generally designated by the numeral 10 (FIG. 1). The wheel alignment system 10 includes a rear wheel assembly 12 and a front wheel assembly 14, which when used together align the rear and front wheels 16, 18 such that they are axially in-line with each other and the longitudinal axis 20 of the motorcycle frame.

Figure 2:
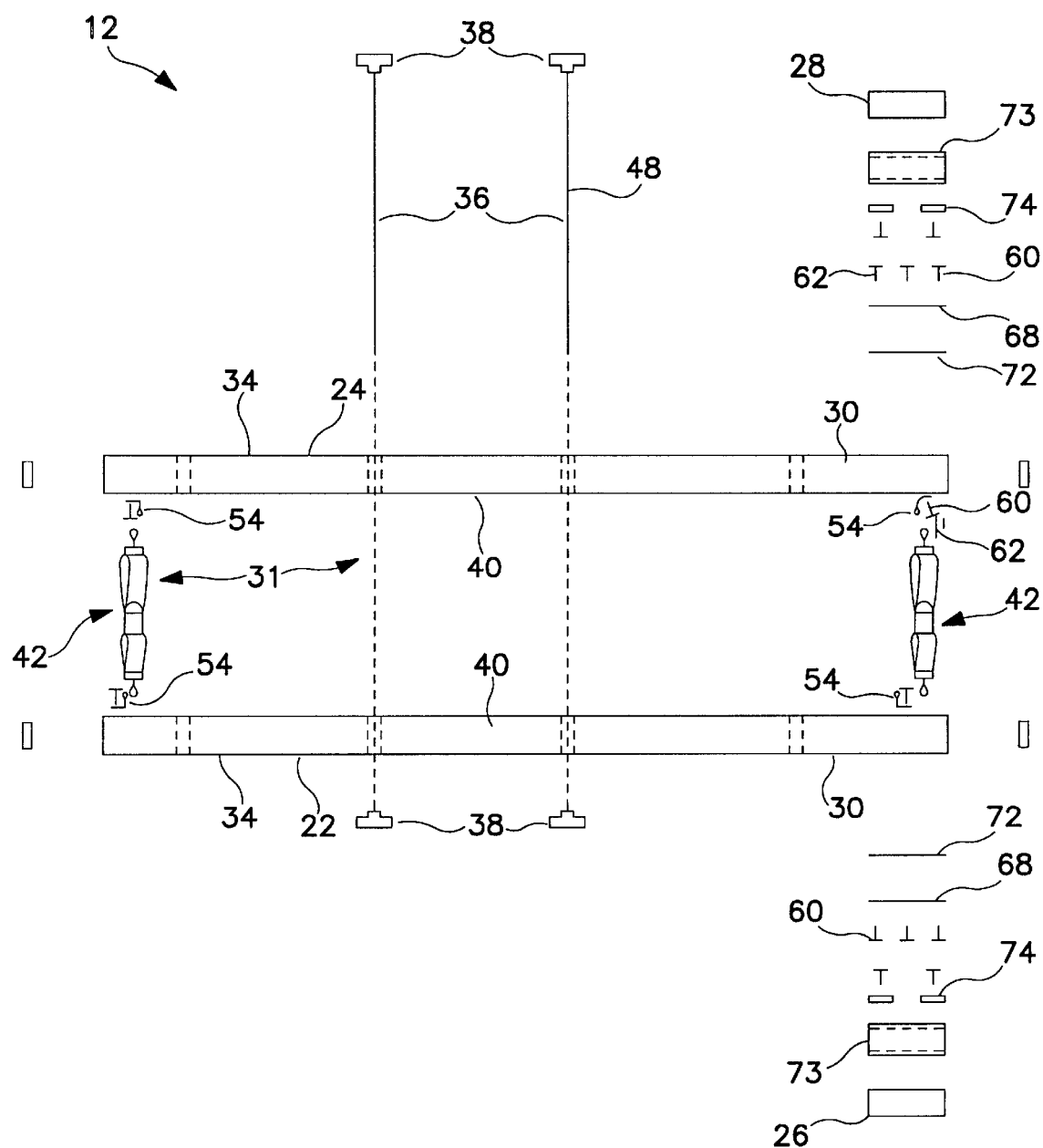
FIG. 2 is an exploded top view of the rear wheel assembly of FIG. 1.
Figure 5:
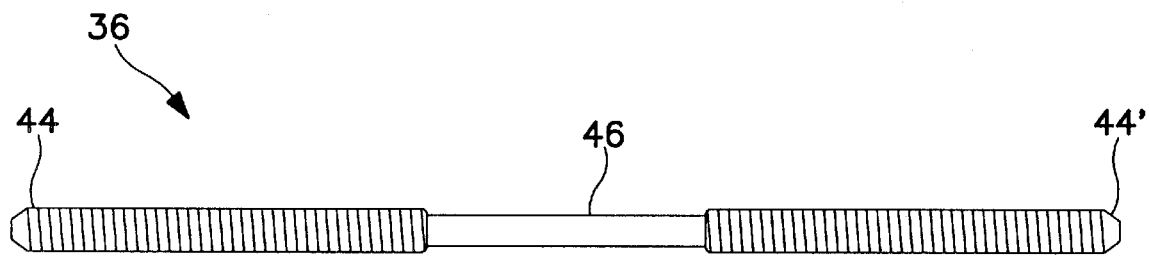
FIG. 5 is an enlarged side view of one of the threaded rods of FIG. 2.

With reference to FIG. 2, the rear wheel assembly 12 includes a rear pair of rigid alignment members 22, 24 which are positioned on the opposite sides of the rear wheel 16 along the corresponding sidewalls of the tire. The alignment members 22, 24 form a chord across the lower portion of the rear tire near the ground and extend longitudinally forward. A conventional light line laser unit 26, 28 is removably mounted to the front end portion 30 of each alignment member 22, 24. A clamping subsystem 31 fixedly clamps the rear pair of alignment members 22, 24 to the rear wheel 16.

Preferably, the second alignment member 24 is a mirror image of the first alignment member 22. Preferably, each alignment member 22, 24 is a hollow, rectangular tube, where the material of the tube and the wall thickness of the tube are selected to ensure that the alignment member 22, 24 will be rigid over its length 32 (FIG. 1), have sufficient strength to withstand normal use without sustaining damage, and be sufficiently light to facilitate portability. For example, an extruded 6063 aluminum one inch by two inch (1"×2") tube having a wall thickness of 0.125 inches has proven to have the required characteristics. The alignment member 22, 24 has a minimum length which is sufficiently large that when mounted on the largest commercially available motorcycle tire, front and rear end portions 30, 34 of the alignment member 22, 24 extend beyond the front and rear of the rear tire, respectively. The maximum length of the alignment member 22, 24 is sufficiently small that the first pair of alignment members 22, 24 do not interfere with the front wheel assembly 14 and such that they do not reduce the portability of the alignment system 10. A length 32 of thirty four inches (34") has been found to be the optimum length.

The clamping subsystem 31 may be any device or combination of devices which: 1) provide sufficient clamping force to prevent relative motion between the rear wheel assembly 12 and the rear wheel 16; 2) do not impose a clamping force which would elastically deform the tire or the alignment members 22, 24 when they are clamped to the wheel 16; 3) allows for flexibility of use over the full range of commercially available motorcycle tires; 4) do not require an inordinate amount of time for installation/de-installation; and 5) do not have an adverse impact on the portability of the alignment system 10. A preferred clamping subsystem 31 includes first and second pairs of threaded rods 36 and quick threading nuts 38 for clamping the middle portions 40 of the alignment members 22, 24 within the tire rim and first and second straps 42 for clamping the front and rear end portions 30, 34 of the alignment members 22, 24 outside of the tire rim. The threaded rods 36 and nuts 38 may be used to mount the alignment members 22, 24 to the rear wheel 16, the straps 42 may be used to mount the alignment members 22, 24 to the rear wheel 16, or a combination of the threaded rods 36 and nuts 38, and the straps 42 may be used to mount the alignment members 22, 24 to the rear wheel 16, thereby providing the flexibility to mount the rear wheel assembly 12 to substantially all commercially available motor cycle tires.

Preferably, each threaded rod 36 is a twelve inch (12") long, five-sixteenths inch (5/16") diameter stainless steel rod having oppositely disposed end segments 44, 44', each having an 18 NC thread. Each rod 36 may have a non-threaded middle segment 46 encased in a polymeric sleeve 48. The rods 36 are inserted through complimentary openings 50 extending through the middle portion 40 of each alignment member 22, 24 and the quick threading nuts 38 are torqued onto the threaded end segments 44, 44' to engage the outside surfaces 52 of the alignment members 22, 24 and thereby mount the rear wheel assembly 12 to the rear wheel 16. Multiple openings 50 are provided in the middle portion 40 of the alignment members 22, 24 to provide flexibility of positioning the threaded rods 36.

Figure 6:
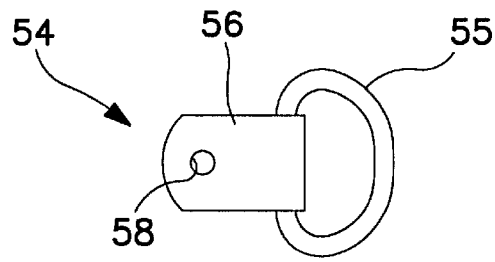
FIG. 6 is an enlarged side view of one of the strap anchors of FIG. 2.
Figure 7:
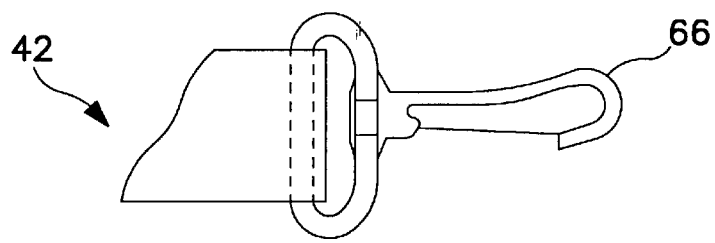
FIG. 7 is an enlarged side view of one of the ends of one of the straps of FIG. 2.
Figure 8:
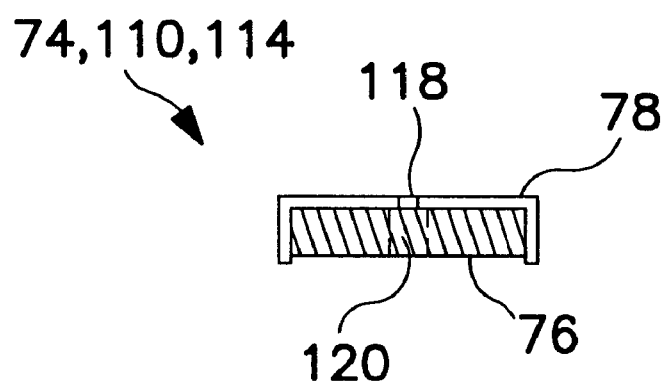
FIG. 8 is an enlarged cross-section view of one of the magnets of FIG. 2.
Figure 9:
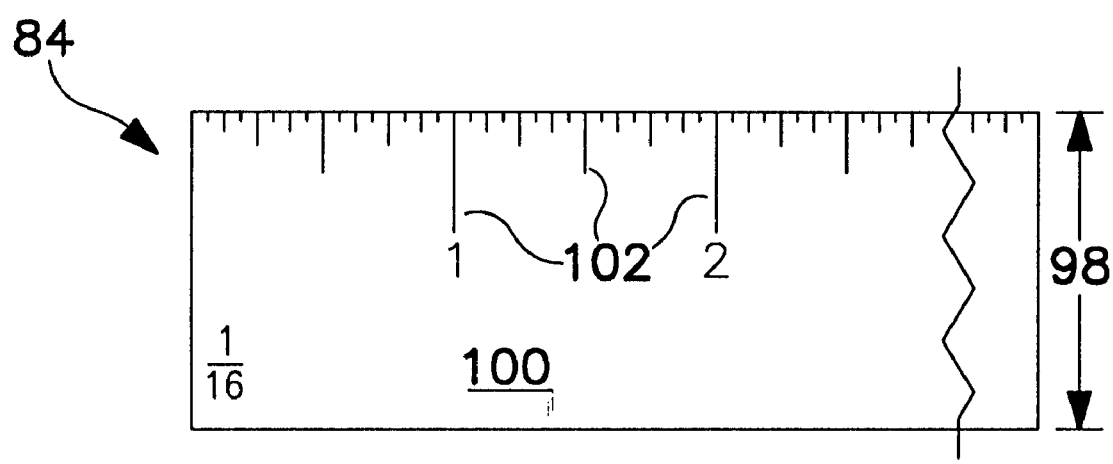
FIG. 9 is an enlarged rear view of one of the measuring indicia of FIG. 10.

Strap anchors 54 (FIG. 6) are mounted to the front and rear end portions 30, 34 of the alignment members 22, 24. Each strap anchor 54 includes a D-ring 55 and a bracket 56. The threaded shaft 60 of a screw 62 is inserted through an opening 58 in each bracket 56 and threadably engages an opening 64, 64' in each end portion 30, 34 to mount the strap anchors 54 to the alignment members 22, 24. With reference to FIG. 7, a hook 66 on each end of strap 42 may be hooked into the D-ring 55 of the strap anchors 54 at each end of the alignment member 22, 24 and the strap 42 tightened to clamp the rear wheel assembly 12 to the rear wheel 16.

The light line lasers 26, 28 may be adequately and expeditiously magnetically mounted to the front end portions 30 of the alignment members 22, 24. If the alignment members 22, 24 are composed of non-ferrous material, as in the preferred embodiment, a mounting plate 68 composed of ferrous material must be mounted to the outside surface 52 of the front end portion 30 of each alignment member 22, 24. Preferably, such mounting plates 68 are formed from $3/32"$ cold rolled steel sheet. The mounting plate 68 may be mounted to the front end portion 30 of the alignment member 22, 24 by conventional means. Preferably, the threaded shafts of multiple screws 62 are inserted through openings in the mounting plates 68 and threadably engage openings 70 in the front end portion 30 of the alignment member 22, 24 such that the mounting plates 68 may be removed and shim stock 72 inserted between the mounting plate 68 and the alignment member 22, 24 to facilitate calibration of the laser units 26, 28.

Spacers 73 may be inserted between the laser units 26, 28 and the alignment members 22, 24 if any motorcycle components lie in the line-of-sight between the laser units 26, 28 and the measuring indicia 84. A magnet 74 mounted to each spacer 73 removably mounts the spacer 73 to the mounting plate 68. Preferably, the magnet 74 is a ceramic magnet 76 disposed within a zinc plated steel channel 78.

Figure 10:
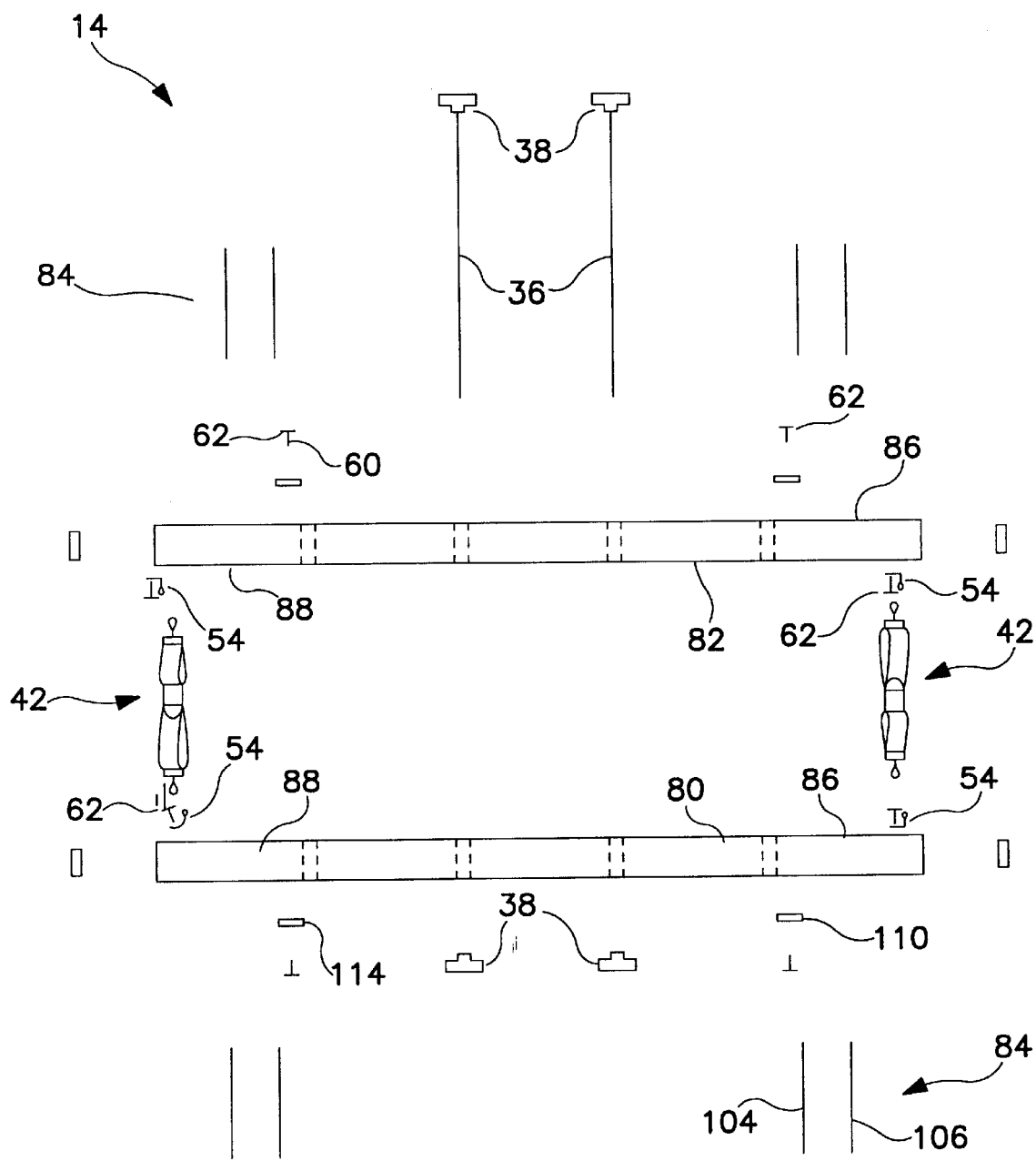
FIG. 10 is an exploded top view of the front wheel assembly of FIG. 1.
Figure 11:
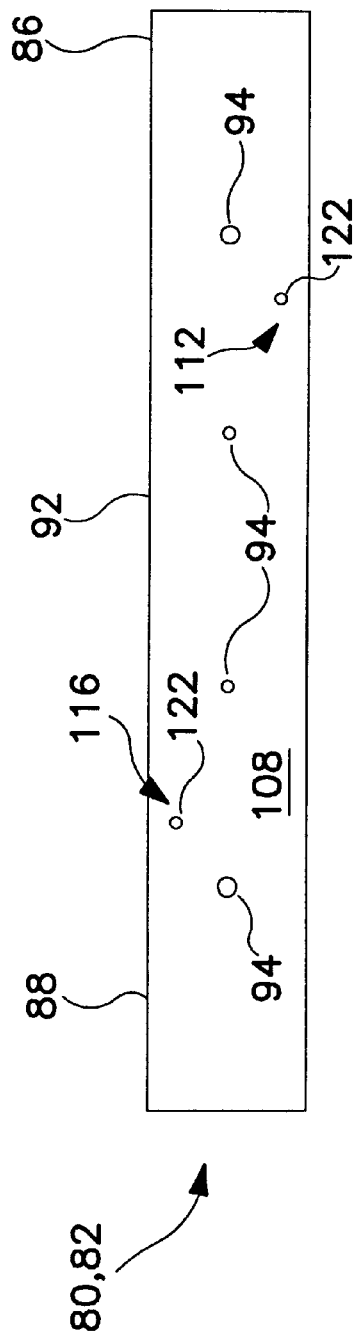
FIG. 11 is an enlarged side view of the outside of one of the alignment members of FIG. 10.
Figure 12:
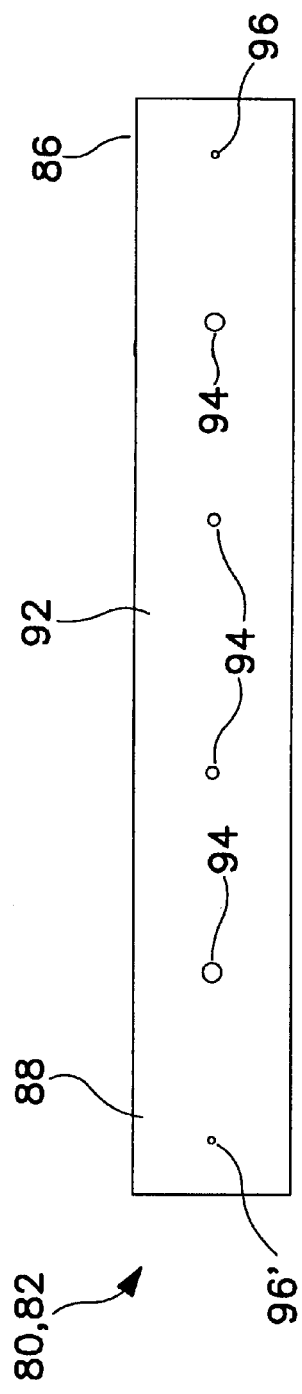
FIG. 12 is a side view of the inside of the alignment member of FIG. 11.

With reference to FIG. 10, the front wheel assembly 14 is similar to the rear wheel assembly 12 in most regards. A front pair of rigid alignment members 80, 82 which are positioned on the opposite sides of the front wheel 18 along the corresponding sidewalls of the tire. The alignment members 80, 82 form a chord across the lower portion of the front tire near the ground and extend longitudinally rearward. Measuring indicia 84 are removably mounted to the front and rear end portions 86, 88 of each alignment member 80, 82. A clamping subsystem 31 fixedly clamps the front pair of alignment members 80, 82 to the front wheel 18.

Preferably, the front pair of alignment members 80, 82 is composed of mirror image alignment members 80, 82 which are subject to the same design constraints as the rear pair of alignment members 22, 24. Therefore, the third and fourth alignment members 80, 82 are preferably composed of the same tube stock as the first and second alignment members 22, 24. The maximum length of the third and fourth alignment members is sufficiently small that the second pair of alignment members 80, 82 do not interfere with the rear wheel assembly 12. A length 90 of thirty two inches (32") has been found to be the optimum length.

The clamping subsystem 31 of the front wheel assembly 14 is subject to the same design constraints as that of the rear wheel assembly 12. Therefore, such clamping subsystem 31 preferably is identical to that of the rear wheel assembly 12 and includes first and second pairs of threaded rods 36 and quick threading nuts 38 for clamping the middle portions 92 of the alignment members 80, 82 within the tire rim and first and second straps 42 for clamping the front and rear end portions 86, 88 of the alignment members 80, 82 outside of the tire rim. The threaded rods 36 and strap anchors 54 of the front wheel assembly 14 are identical in construction to those of the rear wheel assembly 12. Multiple openings 94 are provided in the middle portion 92 of the alignment members 80, 82 for receiving the threaded rods 36. The threaded shaft 60 of a screw 62 is inserted through the opening 58 in the bracket 56 of two strap anchors 54 to engage an opening 96, 96' in each end portion 86, 88 of the third and fourth alignment members 80, 82 to mount the strap anchors 54 to the alignment members 80 82.

The measuring indicia 84 are preferably each composed of machinist style ruler segments composed of ferrous material. Each indicia 84 has a width 98, preferably 1¼ inch, and the rear face 100 of each indicia 84 has a color which contrasts with red laser light, preferably white, to provide a very easily read measurement system 102 which minimizes subjectively. The indicia 84 may include a non-ferrous face plate 104 which is mounted by correctional means on a ferrous substate 106. The measuring indicia 84 are magnetically mounted to the outer surfaces 108 of the third and fourth alignment members 80, 82. A first magnet 110 is mounted to each alignment member 80, 82 at a first indicia position 112 located adjacent to the forward point of contact between tire sidewall datum point and alignment member 80, 82 and a second magnet 114 is mounted at a second indicia location 116 adjacent to the rearward point of contact between tire sidewall datum point and the alignment member 80, 82. The first and second indicia positions 112, 116 are vertically spaced such that the laser line 124 emitted by the laser unit 26, 28 of the rear wheel assembly 12 will be visible on measuring indicia 84 mounted at both positions 112, 116.

Preferably, the magnet 110, 114 is a ceramic magnet 76 disposed within a zinc plated steel channel 78. The magnet 110, 114 may be mounted to the front end portion 86 of the alignment member 80, 82 by conventional means. Preferably, the threaded shaft 60 of a screw 62 is inserted through openings 118, 120 in the steel channel 78 and the ceramic magnet 76 and threadably engage openings 122 in the alignment member 80, 82 to mount the magnet 110, 114 to the alignment member 80, 82. The indicia 84 are affixed with their respective narrow ends set squarely against respective alignment member 80, 82, positioned on the rearward side of each magnet, whereby the ruler segment's graduated rear faces 100 are exposed toward the rear of the motorcycle.

When the rear and front wheel systems 12, 14 are mounted to the rear and front wheels 16, 18, respectively, a laser light line 124 emanating from the laser units 26, 28 mounted on the first and second alignment members 22, 24 is emitted forward and paints a laser light line 124 across each respective pair of front wheel 18 mounted indicia 84. If the rear wheel system 12 is mounted to an exceptionally wide rear wheel 16, the first and second alignment members 22, 24 may be mounted with the outside surface 52 against the wheel 16. Mounting the first and second alignment members 22, 24 in this manner positions the laser units 26, 28 between the alignment members 22, 24 and the motorcycle axis 20, thereby reducing the lateral offset of the laser units 26, 28. The lateral offset measurements can be taken simultaneously at each of four datum points respective of the four chord points of contact of the front wheel 18 and readily displayed as the laser line 124 disposes itself across the ruler segments' graduations 102.

The subject lasers 26, 28 provide narrow dissecting lines 124 which can be easily seen on the indicia 84 and provide an accurate and objective indication of the degree of alignment of the front and rear wheels 18, 16 with respect to each other and with respect to the frame axis 20. The accuracy provided by the lasers 26, 28, which are typical Class III A laser products, is typically given to be ±0.026 inch maximum offset at the distances typically encountered when utilized as described herein. The length of the alignment members 22, 24, 80, 82 and positioning of the lasers 26, 28 on the alignment members 22, 24 further minimizes the distance between the lasers 26, 28 and the indicia 84 and thereby minimizes offset tolerance errors.

As shown in FIG. 1, any lateral offset of the front wheel 18 is easily discovered by objective measurements readily viewable by the user. A condition where the front and rear wheels 18, 16 are set parallel to each other but are not axially in-line with each other or are not axially in-line with the longitudinal axis 20 of the motorcycle chassis will be made readily apparent, as illustrated in FIG. 1.

It should be appreciated that the subject wheel alignment system 10 provides easily seen, very objective measurements of the alignment parameters. The system 10 is compact, comprising separate front and rear subsystems 14, 12 each of which is easily substantially disassembled into its component parts. The separate laser units 26, 28 are more easily packaged for secure storage in transit, are less costly to purchase, are less costly to repair, and provide versatility of use as they can be used for motorcycle applications which are independent of wheel alignment. For example, such laser units can be used to check alignment of the countershaft sprocket to rear wheel sprocket.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A portable alignment system for aligning the front and rear wheels of a motorcycle, the alignment system comprising:
   - a rear wheel assembly including rigid, longitudinally extending, first and second alignment members, first and second laser units removably mounted to the first and second alignment members, and a rear clamping subsystem adapted for removably clamping the first and second alignment members on either side of the rear wheel of the motorcycle; and
   - a front wheel assembly including rigid, longitudinally extending, third and fourth alignment members, at least one measuring indicia removably mounted to each of the third and fourth alignment members, and a front clamping subsystem adapted for removably clamping the third and fourth alignment members on either side of the front wheel of the motorcycle;
   - wherein the first laser unit emits a laser beam onto the measuring indicia mounted to the third alignment member and the second laser unit emits a laser beam onto the measuring indicia mounted to the fourth alignment member to provide an objective indication of the degree of alignment of the front and rear wheels.

2. The alignment system of claim 1 wherein each alignment member is a hollow, rectangular tube.

3. The alignment system of claim 2 wherein each tube is composed of a material and has a wall thickness, the material and the wall thickness being selected to ensure that the tube is rigid.

4. The alignment system of claim 3 wherein the tubes comprising the first and second alignment members have a length of 34 inches and the tubes comprising the third and fourth alignment members have a length of 32 inches.

5. The alignment system of claim 1 wherein each of the alignment members has an outside surface, an inside surface adapted for engaging a wheel, a front end portion, a middle portion, and a rear end portion, the first and second laser units being mounted on the outside surface of the front end portions of the first and second alignment members.

6. The alignment system of claim 5 wherein the first and second laser units are magnetically mounted to the first and second alignment members.

7. The alignment system of claim 6 wherein the rear wheel assembly also includes a plurality of mounting plates composed of ferrous material and a plurality of magnets, one the mounting plates being mounted to each of the front end portions of the first and second alignment members, and one of the magnets being mounted to each of the first and second laser units.

8. The alignment system of claim 1 wherein the measuring indicia include first and second measuring indicia mounted to the third alignment member and third and fourth measuring indicia mounted to the fourth alignment member, the second and fourth measuring indicia being vertically and longitudinally spaced from the first and third measuring indicia, respectively.

9. The alignment system of claim 8 wherein each of the alignment members has an outside surface, an inside surface adapted for engaging a wheel, a front end portion, a middle portion, and a rear end portion, the first measuring indicia being mounted at a mounting location on the outside surface of the front end portion of the third alignment member, the second measuring indicia being mounted at a mounting location on the outside surface of the rear end portion of the third alignment member, the third measuring indicia mounted at a mounting location on the outside surface of the front end portion of the fourth alignment member, and the fourth measuring indicia being mounted at a mounting location on the outside surface of the rear end portion of the fourth alignment member.

10. The alignment system of claim 9 wherein the first and second measuring indicia are magnetically mounted to the third alignment member and the third and fourth measuring indicia are magnetically mounted to the fourth alignment member.

11. The alignment system of claim 10 wherein the front wheel assembly also includes a plurality of magnets and each of the measuring indicia is composed of ferrous material, one of the magnets being mounted at each of the mounting locations of the third and fourth alignment members.

12. The alignment system of claim 11 wherein each of the measuring indicia is a machinist style ruler segment.

13. The alignment system of claim 12 wherein each of the measuring indicia has front and rear surfaces and a width, the width being at least 1.25 inches, the front surface having a white color.

14. A portable alignment system for aligning the front and rear wheels of a motorcycle, the alignment system comprising:
   - a front wheel assembly including a pair of rigid, longitudinally extending, tubular, alignment members and a pair of vertically and longitudinally spaced measuring indicia removably mounted to each of the alignment members;

a rear wheel assembly including a pair of rigid, longitudinally extending, tubular, alignment members and first and second laser units removably mounted to the alignment members; and a clamping subsystem adapted for removably clamping the alignment members of the front and rear wheel assemblies on either side of the front and rear wheels of the motorcycle;

wherein the first laser unit emits a laser beam onto the first and second measuring indicia and the second laser unit emits a laser beam onto the third and fourth measuring indicia to provide an objective indication of the degree of alignment of the front and rear wheels.

15. A portable alignment system for aligning the front and rear wheels of a motorcycle, the alignment system comprising:

a front wheel assembly including a pair of rigid, longitudinally extending, tubular, alignment members and at least one measuring indicia removably mounted to each of the alignment members;

a rear wheel assembly including a pair of rigid, longitudinally extending, tubular, alignment members and first and second laser units removably mounted to the alignment members; and a clamping subsystem adapted for removably clamping the alignment members of the front and rear wheel assemblies on either side of the front and rear wheels of the motorcycle;

wherein each of the laser units emits a laser beam onto a corresponding measuring indicia to provide an objective indication of the degree of alignment of the front and rear wheels.

16. The alignment system of claim 15 wherein the middle portion of each alignment member defines a plurality of laterally extending openings and the clamping system comprises a plurality of threaded rods and a plurality of nuts, each of the threaded rods having oppositely disposed first and second ends, at least one of the threaded rods being insertable through one of the openings of each of the alignment members of the front wheel assembly and at least one of the threaded rods being insertable through one of the openings of each of the alignment members of the rear wheel assembly, one of the nuts being threadably mountable on each of the ends of each of the rods in the front and rear wheel assemblies and being engageable with the alignment members.

17. The alignment system of claim 16 wherein the clamping system further comprises a plurality of cinch straps, one of the cinch straps being engageable with the front end portions of the alignment members of each of the wheel assemblies and one of the cinch straps being engageable with the rear end portions of the alignment members of each of the wheel assemblies.

18. The alignment system of claim 15 wherein the clamping system comprises a plurality of cinch straps, one of the cinch straps being engageable with the front end portions of the alignment members of each of the wheel assemblies and one of the cinch straps being engageable with the rear end portions of the alignment members of each of the wheel assemblies.

19. The alignment system of claim 18 wherein the front and rear end portions of each of the alignment members each define a laterally extending opening and the clamping system further comprises a plurality of screws and a plurality of strap anchors, each of the strap anchors having a D-ring portion and a mounting bracket portion, the mounting bracket portion defining an opening, one of screws being insertable through the opening of the mounting bracket portion and being threadably engageable within one of the openings in the front and rear end portions of each of the alignment members, whereby one of the strap anchors is mounted to each of the front and rear end portions of each of the alignment members.

20. The alignment system of claim 19 wherein each of the cinch straps has oppositely disposed ends and a hook mounted on each of the ends, each of the hooks of one of the cinch straps being engageable with the D-ring portion of one of the strap anchors.

* * * * *